United States Patent [19]

Boos

[11] Patent Number: 4,604,788
[45] Date of Patent: Aug. 12, 1986

[54] METHOD FOR MAKING ELECTRODES FOR DOUBLE LAYER CAPACITORS

[75] Inventor: Donald L. Boos, Garfield Hts., Ohio

[73] Assignee: The Standard Oil Company, Cleveland, Ohio

[21] Appl. No.: 745,172

[22] Filed: Jun. 17, 1985

[51] Int. Cl.⁴ .............................................. H01G 9/00
[52] U.S. Cl. ..................................................... 29/570
[58] Field of Search ........................................ 29/570

[56] References Cited

U.S. PATENT DOCUMENTS 3,675,087 7/1972 Zykov et al. .......................... 29/570
3,679,944 7/1972 Yoshimura et al. .................. 29/570

Primary Examiner—R. L. Andrews
Attorney, Agent, or Firm—H. M. Snyder; D. M. Ronyak; G. R. Plotecher

[57] ABSTRACT

A method for making electrodes for use in double layer capacitors comprising adding to a carbon powder-electrolyte mix an excess of liquid to render the mix pumpable, moderately overfilling an electrode cavity with the mix and removing the excess liquid in an equilibration step so that the remaining mix substantially fills the electrode cavity.

23 Claims, 3 Drawing Figures

U.S. Patent  Aug. 12, 1986  4,604,788
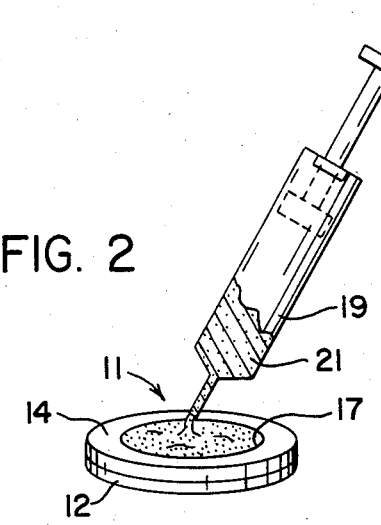
FIG. 2
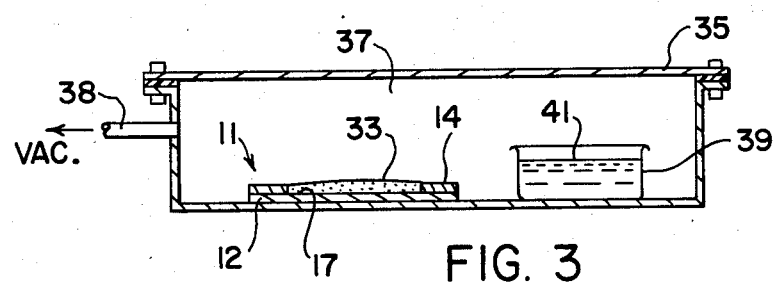
FIG. 3
FIG. 1
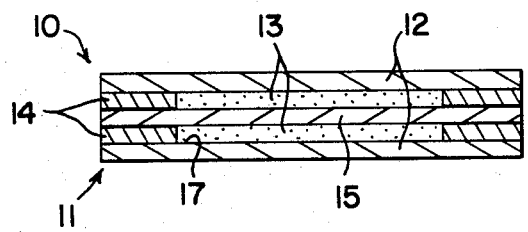

METHOD FOR MAKING ELECTRODES FOR DOUBLE LAYER CAPACITORS

BACKGROUND OF THE INVENTION

1. Field of the Invention

This invention is concerned with double layer capacitors and, more particularly, with an improved method for forming the electrodes of such double layer capacitors.

2. Description of the Prior Art

Double layer capacitors are disclosed in prior U.S. Pat. Nos. including: 3,536,963, 3,652,902, 4,327,400, 4,394,713.

In general, the above patents describe double layer capacitors which comprise a pair of polarization electrodes having a separating medium therebetween. The electrodes are composed of a solid and liquid phase and the electric double layer which characterizes these capacitors is formed at the interface between the solid and liquid (electrolyte) phases of the electrodes. The separating medium acts as an electronic insulator between the electrodes, but is sufficiently porous to permit ion migration therethrough.

A double layer capacitor is therefore made up of two half-cells assembled on either side of a separator element. Each half-cell comprises an electrode element, a horizontally enclosing cell wall for the electrode element and a conductor element contacting one end wall of the electrode element. The cell wall and conductor element, when assembled, thus provide a structure having an electrode cavity in which the electrode is formed.

Double layer capacitors can be made in miniature size, yet they exhibit very large capacitance when compared with conventional capacitors of similar or near similar size.

In the present construction of the double layer capacitor, the electrode is made up of high surface area carbon particles associated with an electrolyte such as $H_2SO_4$, at a concentration of 25 wt. % $H_2SO_4$. The electrode material also contains about 0.2 moles of H Br per liter which acts as a voltage regulator. When ready for deposit in the electrode cavity, this electrode material has the consistency of a damp powder; i.e., the powder particles do not flow readily and tend to pack down and adhere to each other under even light pressure. The electrode is made by first preparing carbon electrode material as follows:

A. A quantity of high surface area carbon, which may be an activated carbon, is given four acid washes with an excess amount of acid; an exemplary acid being a 25% solution of $H_2SO_4$.

B. The carbon-acid mix is filtered and, following filtration, the acid-saturated carbon is pressed at 3000 psi to force out the excess acid, leaving a damp powder product.

C. The damp powder is then weighed out in an amount adequate to fill the cell cavity and then is pressed into the cavity.

This method of preparing electrodes for double layer capacitors may be termed the "damp powder" method.

It will be appreciated that this damp carbon electrode material is difficult to meter accurately, does not invariably completely fill the cell cavity when pressed into it, and even when it does, the density of electrode material may vary from point to point within the electrode adversely affecting the electrical characteristics of the finished capacitor.

A more fluid electrode material could be more accurately metered and would minimize or eliminate the problems of filling the cell cavity and obtaining uniform density. However, previous attempts to use a more fluid electrode material failed; either the electrical resistance of the capacitor was too high or the electrode material exuded from the cell under the pressure exerted. Substantial improvement in electrical properties of double layer capacitors can be attained by a method for forming electrodes which avoids the disadvantages of the present method outlined above.

SUMMARY OF THE INVENTION

The present invention is directed to an improvement in the method of making carbon electrodes used in double layer capacitors.

Broadly speaking, the method calls for providing a more fluid or pumpable carbon-electrolyte mix (electrode material) for filling an electrode cavity. The electrode cavity is moderately over-filled with the fluid mix and then the mix is reduced in volume to match the volume of the electrode cavity by an equilibration step.

In more specific terms, water or other liquid is added to the carbon particle-electrolyte mix in an amount sufficient to render the mix pumpable. The mix, now containing an excess of water or other liquid, is pumped or otherwise delivered into the electrode cavity of a capacitor half-cell in an amount in excess (overfilling) of the desired final volume of the electrode. The mix in the electrode cavity is subjected to equilibration at subatmospheric pressure. In the case where excess water has been added to the mix, the half-cell with the mix in the electrode cavity thereof is placed in a humidity controlled subatmospheric environment to equilibrate the mix to remove the excess water and obtain a 25% $H_2SO_4$ electrolyte concentration. A thickening agent such as fumed $SiO_2$ may also be added to the mix prior to equilibration to maintain the dispersion of carbon particles in the mix.

Overfilling the electrode cavity involves a slight "heaping up" of the electrode material in the electrode cavity, which with the excess water therein, has a consistency similar to mayonnaise. In some cases a temporary spacer or dam may be provided surrounding the electrode cavity to retain excess electrode material during equilibration.

DESCRIPTION OF THE DRAWINGS

FIG. 1 is an elevational sectional view schematically showing a double layer capacitor of the invention.

FIG. 2 is a prospective view of a half-cell assembly of a double layer capacitor shown with means for filling the electrode cavity.

FIG. 3 is an elevational sectional view of a half-cell with an over-filled electrode cavity undergoing equilibration in a vacuum chamber.

DETAILED DESCRIPTION OF THE INVENTION

In the following description, reference will be made to certain terms which are here defined:

"Equilibration or "equilibrating" as used herein, is the process of removing excess fluidizing agent from a dispersed carbon particle material to achieve good carbon-to-carbon contact in the material.

"Equivalent series resistance (ESR)" is that portion of the impedance at which the voltage is in phase with the current.

In FIG. 1, the single cell double layer capacitor depicted comprises two half-cells 10 and 11 assembled so that they contact the separator member 15. Each half-cell comprises a collector member 12, which is made of an impervious conducting and ionic insulating material, a cell wall or gasket 14 affixed to collector member 12, preferably made of an insulating material, and a carbon electrode 13 located in the electrode cavity 17 defined by collector member 12 and cell wall 14.

The collector member 12 may be made of carbon-loaded butyl rubber, metals such as lead, nickel, tantalum, or other inert impervious conducting material, such as other carbon-loaded plastics. Collector member 12 is characterized by its electrical conducting property and its chemical inertness to the particular electrolyte employed at the potential impressed upon it. Its primary functions are as a current collector and inter-cell ionic insulator.

Cell wall or gasket 14 has the function of confining electrode 13 in electrode cavity 17 and is somewhat flexible to accommodate expansion and construction of the electrode. Cell wall 14 may be made of butyl rubber compounds, and, when the collector member is also made of a butyl rubber compound, the cell wall 14 and the collector member 12, as assembled, can be vulcanized at the same time to form a strong bond with cross-linked polymer chains across the juncture of these members.

Carbon electrode 13 consists of high surface area carbon, say 100 to 2000 meters$^2$/g, and an electrolyte associated therewith. Activation of carbon is a process by means of which greatly improved absorbtion properties and surface area are imparted to a naturally occurring carbonaceous material. Because electrical energy storage of a capacitor is apparently based on surface area, an increase in energy storage can be expected from an increase in surface area, as by activation. An extensive discussion of activation of carbon is set forth in U.S. Pat. No. 3,536,963 and is incorporated by reference here.

Separator 15 is generally made of highly porous material which functions as an electronic insulator between the electrodes, yet affording free and unobstructed movement to the ions in the electrolyte. The pores of the separator 15 must be small enough to prevent carbon-to-carbon contact between the opposing electrodes, since such a condition would result in a short circuit and consequent rapid depletion of the charges accumulated on the electrodes. The separator can also be a nonporous ion-conducting material, such as the ion exchange membranes. Of the numerous ion exchange membranes, polyzirconium phosphate and the perfluorosulfonic acid membrane sold under the trademark NAFION by E. I. Dupont de Nemours & Co. are of particular interest. Conventional battery separators may be suitable provided they are strong enough to resist crushing during the assembly process and have pores small enough to prevent carbon particles from penetrating through the separator. Materials such as porous polyvinyl chloride, porous polypropylene, glass fiber filter paper, cellulose acetate, mixed esters of cellulose, and fiber glass cloth have been tried and were found to be useful. Prior to its use the separator may be saturated with electrolyte for about 15 minutes or less. The saturation step is not required in all cases.

An improved electrode fabrication technique for the double layer capacitor has been developed. The electrode material in contrast with past processes is a pumpable paste consisting of carbon and electrolyte with excess water added. The extra water gives the carbon paste a consistency that can be pumped into the cell cavity. In FIG. 2 a half-cell 11 is illustrated with pump means 19 poised to deliver a charge of pumpable electrode paste 21 into the cell cavity 12. After the electrode material is pumped into the cell cavity the excess water is removed by evaporation. In the past all attempts to use a paste of this consistency failed. Either the electrode was forced from the cell or the cell resistance of the completed cell was too high. The concept of using extra water in the paste, then removing this water in an equilibration step, eliminates these two problems.

The work presented herein uses excess water but any miscible liquid having a boiling point below that of water and which will fluidize the electrode material, but not react with the electrolyte, will work. One such liquid is the ether, 1-2 dimethoxyethane. Fumed silica was added to the electrode material to help the flow characteristics and to keep the carbon in suspension. The fumed silica improves the electrode, but it is not essential. While fumed silica was used in this work, any thickening agent that does not react with the electrolyte can be used, for example, barium sulfate.

After the electrode material is metered into the cell cavity the extra water must be removed. The most reliable way is to equilibrate the electrode to a specific relative humidity. This will ensure a specific concentration of the electrolyte. In the work described herein, this was done in a vacuum chamber. In FIG. 3, half-cell 11 is shown in a vacuum chamber 35 which has a connector 38 to a vacuum source and a vessel 39 therein containing an equilibrating medium 41 for maintaining a controlled atmosphere in the partially evacuated volume 37 of vacuum chamber 35. The cell cavity 17 has been moderately overfilled with a quantity of electrode material 33 containing excess water. The lower pressure in vacuum chamber 35 lowers the boiling point of the electrolyte and results in a rapid equilibrium. If a liquid other than water is used to make the electrode material more fluid, it must be volatile at a temperature below the boiling point of water at the equilibration pressure. Again, maintaining constant humidity will permit removing the excess solvent without changing the electrolyte concentration. The equilibrating medium in vessel 39 may be a 25 wt. % solution of $H_2SO_4$ or a saturated KCl solution.

Raising the temperature would achieve the same result as reduced pressure and could also be used alone or in combination with reduced pressure.

In making the electrode materials of this invention, fine particle carbon is given four acid washes with excess acid ($H_2SO_4$) just as in the present procedure. The acid-washed carbon is filtered and then water and fumed silica (sold under the trademark Cab-O-Sil by Cabot Corporation) are added to achieve a mix having a toothpaste-like consistency. The cell cavity is filled (moderately overfilled) by pumping the electrode material into the cell cavity. The cells are then placed in a vacuum chamber and equilibrated at a vapor pressure of water equal to an acid concentration of 25% $H_2SO_4$. A vessel containing a 25 wt. % solution of $H_2SO_4$ is placed in the vacuum chamber to establish and maintain the desired vapor pressure of water in the chamber.

The electrode materials set forth in Table I below were prepared:

TABLE I

| Sample | Filtered Carbon (grams) | Fumed Silica (grams) | Water (grams) |
|---|---|---|---|
| A | 5 | 0.1 | 0.6 |
| B | 5 | 0.15 | 0.5 |
| C | 5 | 0.1 | 0.5 |

Each of the electrode materials A, B and C was pumped into four half-cells and the half-cells were then equilibrated for a period of over fifteen hours. Fifteen hours was a convenient period (overnight), but it has since been demonstrated that a four hour period is an adequate equilibration time for half-cells of this size. It was determined that weight loss during equilibration (due almost exclusively to evaporation of water) was approximately 10% (low 8.7%, high 10.8%).

The half-cells of each electrode material were matched on a weight basis to obtain double layer capacitor electrode weights as nearly equal as possible and then assembled with a separator between them and under a pressure of about 100 psi. Thus, two double layer capacitors of each electrode material were made and the equivalent series resistance (ESR) of these units was measured with the results set forth in Table II. The electrode weights of the two half cell electrodes in each capacitor are also indicated in Table II below:

TABLE II

| Cell | ESR (ohms) | Half-Cell Electrode Material Weights (grams) |
|---|---|---|
| $A_1$ | 0.17 | 0.5535, 0.4898 |
| $A_2$ | 0.19 | 0.5234, 0.5373 |
| $B_1$ | 0.23 | 0.4275, 0.4443 |
| $B_2$ | 0.20 | 0.5615, 0.4661 |
| $C_1$ | 0.56 | 0.4060, 0.4330 |
| $C_2$ | 0.23 | 0.4822, 0.5212 |

All of these double layer capacitors are well within acceptable limits on resistance and are entirely comparable with capacitors made by the prior "damp powder" method.

The double layer capacitors were charged for a period of 24 hours at a 1 volt or 0.9 volt charge level. The cells were then discharged at approximately 50 milliamps and the times required for complete discharge were recorded. The capacitance was then calculated from the formula: $CV=Q$ (where $Q=$ Current X Time). This data is set forth in Table III below:

TABLE III

| Cell | Discharge Time (Sec.) | Capacitance (Farads) | Cell Volts |
|---|---|---|---|
| $A_1$ | 435 | 23.8 | 0.9 |
| $A_2$ | 425 | 23.3 | 0.9 |
| $B_1$ | 395 | 19.75 | 1.0 |
| $B_2$ | 447 | 22.35 | 1.0 |
| $C_1$ | 286 | 13.48 | 0.91 |
| $C_2$ | 370 | 20.26 | 0.91 |

In general, the cells with more electrode material had higher capacities. Changes in amount of fumed silica within the limits tried had little effect in terms of capacitance. The capacitance obtained was in the same range as that secured with double layer capacitors made by the "damp powder" method.

There has thus been provided a relatively simple process for manufacturing carbon electrode members having relatively uniform structure for double layer capacitors. Although the present invention has been described in conjunction with preferred process embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for forming an electrode within an electrode cavity, said electrode to be formed from a damp powder mix of solid, conductive, particulate material and an electrolyte, comprising the steps of:
   a. adding a predetermined excess of liquid to the damp powder mix to render it possible,
   b. pouring the mix into said electrode cavity to slightly overfill said cavity,
   c. removing the excess liquid from the poured mix to return the mix to damp powder consistency thereby assuring contact between the solid particles of the electrode.

2. The process of claim 1 wherein the solid, particulate material is activated carbon particles.

3. The process of claim 1 wherein the excess liquid added is water.

4. The process of claim 3 wherein the electrolyte is a 25 wt. % solution of $H_2SO_4$.

5. The process of claim 4 wherein the electrolyte also contains 0.2 moles of H Br as a voltage regulator.

6. The process of claim 1 wherein the removal of liquid is carried out by evaporation.

7. The process of claim 5 wherein the removal of water is carried out by evaporation.

8. The process of claim 7 wherein the evaporative process is carried out at temperatures up to 80° C.

9. The process of claim 7 wherein the evaporative process is conducted in an enclosure under subatmospheric pressure.

10. The process of claim 9 wherein the vapor pressure within said enclosure is maintained at a predetermined level by providing an open reservoir of an equilibrating medium.

11. The process of claim 10 wherein said equilibrating medium is a saturated solution of KCl.

12. The process of claim 10 wherein said equilibrating medium is a 25 wt. % $H_2SO_4$ solution.

13. A process for making a half-cell for use in the manufacture of double layer capacitors comprising the steps of:
   a. providing a half-cell assembly composed of a conductive layer having a non-conductive cell wall affixed thereto to define an electrode cavity,
   b. filtering a quantity of carbon particles which have been washed in an excess of acid electrolyte to separate said carbon particles from at least a portion of said acid electrolyte,
   c. mixing with the filtered carbon particle-acid residue a sufficient quantity of liquid to produce a pumpable carbon electrode mixture,
   d. pumping an amount of said pumpable carbon electrode mixture into said cavity, and
   e. subjecting said overfilled half-cell assembly to a controlled humidity environment and evaporating liquid from the carbon electrode mixture to restore the acid concentration of the electrolyte to that of the electrolyte following step b. above.

14. The process of claim 13 wherein said acid electrolyte is a 25 wt. % $H_2SO_4$ solution.

15. The process of claim 14 wherein said 25 wt. % $H_2SO_4$ solution contains 0.2 moles of hydrogen bromide as a voltage regulator.

16. The process of claim 14 wherein the liquid used is water.

17. The process of claim 16 wherein an excess of about 10% by volume of water is employed.

18. The process of claim 17 wherein the electrode cavity is overfilled by approximately 10% by volume.

19. The process of claim 13 wherein said environment is maintained at a pressure determined by the vapor pressure of water.

20. The process of claim 18 wherein said environment is maintained at a pressure determined by the vapor pressure of water.

21. The process of claim 13 wherein the temperature of said environment is increased to up to 80° C. to promote evaporation.

22. The process of claim 18 wherein the temperature of the environment is increased to a level below the boiling point of the electrolyte being used at that pressure to promote evaporation.

23. A process for making a double layer capacitor comprising the steps of:

a. providing a half-cell assembly composed of a conductive layer to which is bonded a non-conductive cell wall thereby defining an electrode cavity, b. filtering a quantity of carbon particles which have been washed in excess acid to separate said carbon particles from at least a portion of said acid, c. mixing with the filtered carbon particle-acid residue a sufficient quantity of water and thickening agent to produce a pumpable carbon electrode mixture, d. pumping an amount of said pumpable carbon electrode mixture into said electrode cavity to moderately overfill said cavity, e. subjecting said overfilled half-cell assembly to a controlled humidity subatmospheric environment to remove excess water from the carbon electrode mixture to restore the acid concentration of the electrode mixture to that prevailing, therein following step (b) above, f. repeating above steps a through e to provide a second half-cell, g. assembling the double layer capacitor by placing said half-cells in a relative position such that the open electrode surfaces face each other, providing a porous ion-permeable separator member between and in contact with both electrodes and securing all of the elements together.

* * * * *

UNITED STATES PATENT AND TRADEMARK OFFICE
CERTIFICATE OF CORRECTION

PATENT NO. : 4,604,788
DATED : August 12, 1986
INVENTOR(S) : Donald L. Boos

It is certified that error appears in the above-identified patent and that said Letters Patent is hereby corrected as shown below:

In claim 1, line 14, delete "possible" and substitute --pourable--.

Signed and Sealed this

Twenty-eighth Day of October, 1986

[SEAL]

Attest:

DONALD J. QUIGG

Attesting Officer     Commissioner of Patents and Trademarks